US011665093B2

(12) United States Patent
Kelly et al.

(10) Patent No.: US 11,665,093 B2
(45) Date of Patent: May 30, 2023

(54) LATENCY-DRIVEN MULTI-MEDIA REDIRECTION

(71) Applicant: Dell Products L.P., Round Rock, TX (US)

(72) Inventors: John Kelly, Mallow (IE); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/505,841

(22) Filed: Oct. 20, 2021

(65) Prior Publication Data

US 2023/0119545 A1    Apr. 20, 2023

(51) Int. Cl.
*H04L 45/00* (2022.01)
*G06F 9/451* (2018.01)

(52) U.S. Cl.
CPC .............. *H04L 45/70* (2013.01); *G06F 9/452* (2018.02)

(58) Field of Classification Search
CPC .................................. H04L 45/70; G06F 9/452
See application file for complete search history.

(56) References Cited

U.S. PATENT DOCUMENTS

| | | | |
|---|---|---|---|
| 10,623,789 B1 * | 4/2020 | Spracklen | H04N 21/43072 |
| 2011/0267952 A1 * | 11/2011 | Ko | H04L 43/0864 |
| | | | 370/237 |
| 2012/0017121 A1 * | 1/2012 | Carlson | H04L 43/16 |
| | | | 714/43 |
| 2015/0032853 A1 * | 1/2015 | Asahi | H04L 41/0677 |
| | | | 709/219 |
| 2020/0296036 A1 * | 9/2020 | Chu | H04L 43/0817 |
| 2021/0044531 A1 * | 2/2021 | Mellette | H04Q 3/0004 |

* cited by examiner

*Primary Examiner* — Mohamed A. Wasel
*Assistant Examiner* — Jihad K Boustany
(74) *Attorney, Agent, or Firm* — Chamberlain, Hrdlicka, White, Williams & Aughtry

(57) ABSTRACT

A method and system for latency-driven multi-media redirection. Through multi-media redirection, multi-media content from one or more multi-media sources may be re-routed to an endpoint to be decoded and/or rendered thereon. This redirection of multi-media content diverges from the traditional approach of directing the multi-media content from the multi-media source(s) to an information technology environment to be decoded and/or rendered prior to delivery of the decoded/rendered multi-media content to an endpoint. Current criteria for employing multi-media redirection are many, however, fail to consider network latency as a potentially crucial factor in the decision process for enabling or disabling multi-media redirection. Accordingly, the disclosed method and system propose the automated enablement or disablement of multi-media redirection based on network latency analyses. The disclosed method and system further propose the reconfiguration of quality of service prioritizations, based on whether latency-driven multi-media redirection is enabled or disabled, to optimize end user experience.

18 Claims, 3 Drawing Sheets

LATENCY-DRIVEN MULTI-MEDIA REDIRECTION

BACKGROUND

Through multi-media redirection, multi-media content from one or more multi-media sources may be re-routed to an endpoint to be decoded and/or rendered thereon (rather than being decoded/rendered at an information technology environment as is the traditional approach). Current criteria for employing multi-media redirection are many, however, fail to consider network latency as a potentially crucial factor in the decision process for enabling or disabling multi-media redirection.

SUMMARY

In general, in one aspect, the invention relates to a method for latency-driven multi-media redirection. The method includes identifying at least one multi-media source; calculating a first average latency for first multi-media network traffic traversing through a direct network path from the at least one multi-media source to a client device; calculating a second average latency for second multi-media network traffic traversing through an indirect network path from the at least one multi-media source to the client device; and managing multi-media network traffic from the at least one multi-media source to the client device based on a relation between the first average latency and the second average latency.

In general, in one aspect, the invention relates to a non-transitory computer readable medium (CRM). The non-transitory CRM includes computer readable program code, which when executed by a computer processor, enables the computer processor to perform a method for latency-driven multi-media redirection. The method includes identifying at least one multi-media source; calculating a first average latency for first multi-media network traffic traversing through a direct network path from the at least one multi-media source to a client device; calculating a second average latency for second multi-media network traffic traversing through an indirect network path from the at least one multi-media source to the client device; and managing multi-media network traffic from the at least one multi-media source to the client device based on a relation between the first average latency and the second average latency.

In general, in one aspect, the invention relates to a system. The system includes at least one multi-media source; a client device operatively connected to the at least one multi-media source; and a multi-media redirection orchestrator operatively connected to the at least one multi-media source and the client device, and comprising a computer processor configured to perform a method for latency-driven multi-media redirection. The method includes identifying the at least one multi-media source; calculating a first average latency for first multi-media network traffic traversing through a direct network path from the at least one multi-media source to a client device; calculating a second average latency for second multi-media network traffic traversing through an indirect network path from the at least one multi-media source to the client device; and managing multi-media network traffic from the at least one multi-media source to the client device based on a relation between the first average latency and the second average latency.

Other aspects of the invention will be apparent from the following description and the appended claims.

DETAILED DESCRIPTION

Figure 1:
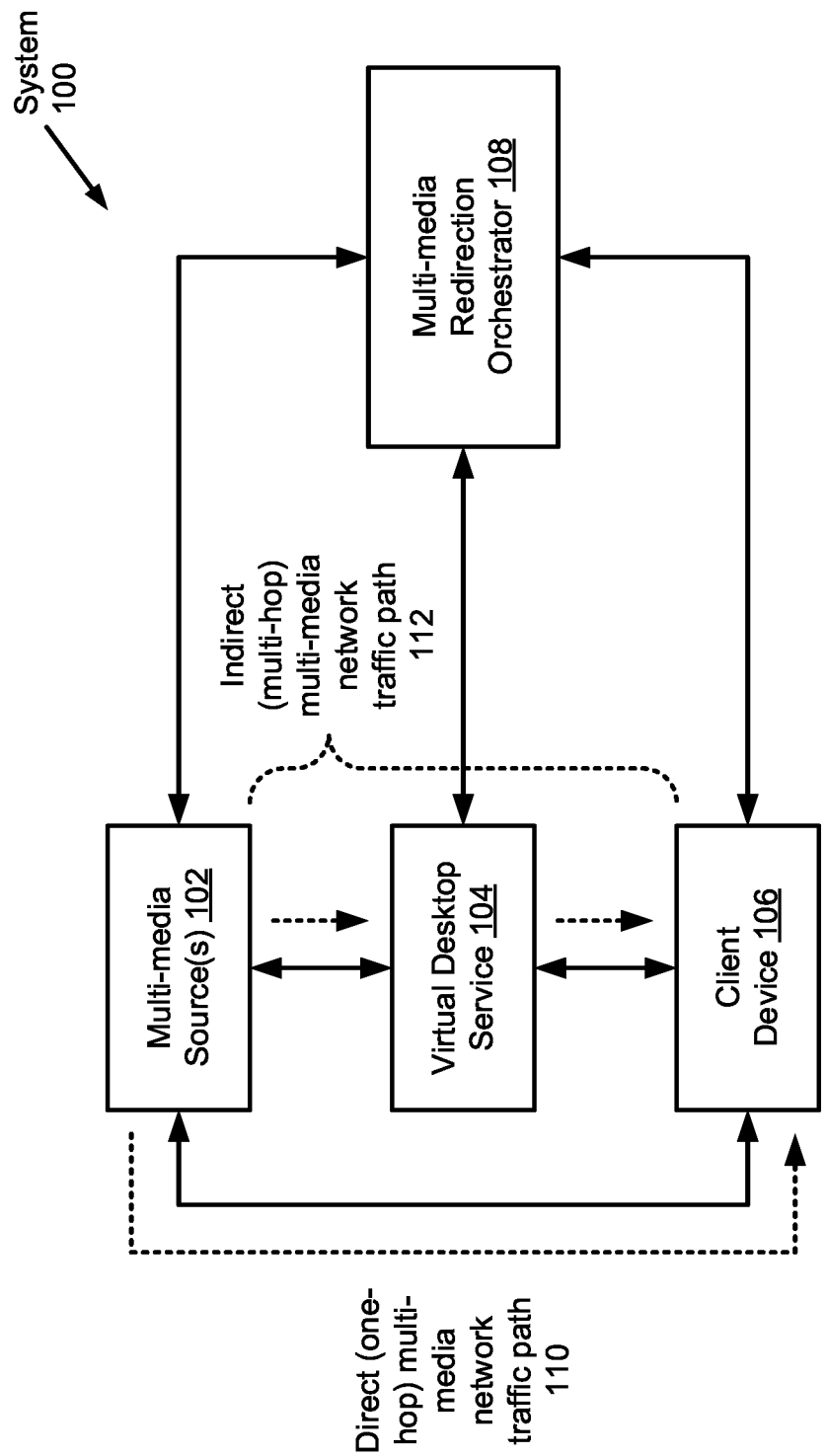
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to latency-driven multi-media redirection. Through multi-media redirection (or MMR), multi-media content from one or more multi-media sources may be re-routed to an endpoint, where the multi-media content may be decoded and/or rendered thereon. This redirection of multi-media content diverges from the traditional approach of directing the multi-media content from the multi-media source(s) to an information technology (IT) environment (e.g., a data center, the cloud, etc.) to be decoded and/or rendered prior to delivery of the decoded/rendered multi-media content to an endpoint. Current criteria for employing multi-media redirection may often be the capabilities of the endpoint estate, a corporate desire to reduce the IT environment footprint or total cost of ownership (TCO), and the available network bandwidth between the endpoint and the IT environment. Network latency, however, may be considered a crucial factor in the decision process for enabling or disabling multi-media redirection. Accordingly, embodiments of the invention propose the automated enablement or disablement of multi-media redirection based on network latency analyses. Embodiments of the invention further propose the reconfiguration of quality of service (QoS) prioritizations, based on whether latency-driven multi-media redirection is enabled or disabled, to optimize end user experience.

FIG. 1 shows a system in accordance with one or more embodiments of the invention. The system (100) may include one or more multi-media sources (102), a virtual desktop service (104), a client device (106), and a multi-media redirection orchestrator (108). Each of these system (100) components is described below.

In one embodiment of the invention, a multi-media source (102) may represent any physical appliance, computing system, or software application (executing on the underlying hardware of a physical appliance or computing system) designed and configured to store and share multi-media locally or remotely over a network. Multi-media may refer to content formed through any combination of different media formats that may include, but are not limited to, text, audio, still images, animations, video, and interactivity. A multi-media source (102), accordingly, may necessitate, and thereby may at least include, compute, storage, and network bandwidth resources. Further, a multi-media source (102) may include functionality to: receive content requests for stored multi-media from content requestors (e.g., virtual desktop service (104)); and deliver the requested multi-media to content decoders (e.g., virtual desktop service (104) when multi-media redirection is disabled, or client device (106) when multi-media redirection is enabled) in response to the content requests. One of ordinary skill, however, may appreciate that a multi-media source (102) may perform other functionalities without departing from the scope of the invention. Examples of a multi-media source (102) may include, but are not limited to, a network server, a desktop computer, a laptop computer, network attached storage (NAS), any other computing system similar to the exemplary computing system shown in FIG. 3, or any computer software that may execute on any of the aforementioned hardware and may be capable of performing at least the aforementioned functionalities.

In one embodiment of the invention, the virtual desktop service (104) may represent any information technology (IT) environment designed and configured to deploy virtual desktops remotely through virtualization. Specifically, the virtual desktop service (104) may include functionality to: create and manage various virtual desktop instances reflective of desktop operating systems, as well as any other desktop software applications, using virtual machines; and deliver the virtual desktop instances over a network to endpoints (e.g., client device (106)). When an endpoint wishes to interact with multi-media content, the virtual desktop service (104) may include further functionality to submit content requests for multi-media to the multi-media source(s) (102) and, subsequently, host or decode the requested multi-media thereon within the respective virtual desktop instance. The process of multi-media decoding and/or rendering at/on the virtual desktop service (104) may represent a more traditional approach to multi-media content handling that transpires when multi-media redirection (described above) is disabled. While disabled, any requested multi-media content may traverse an indirect, multi-hop network traffic path (112) between the multi-media source(s) (102) and the client device (106) by way of the virtual desktop service (104). One of ordinary skill, however, will appreciate that the virtual desktop service (104) may perform other functionalities without departing from the scope of the invention.

In one embodiment of the invention, the virtual desktop service (104) may be implemented using one or more network servers (not shown). Each network server may encompass a physical or a virtual network server, which may reside in an on-premises data center, a cloud computing environment, or a hybrid infrastructure thereof. Additionally, or alternatively, the virtual desktop service (104) may be implemented using one or more computing systems similar to the exemplary computing system shown in FIG. 3.

In one embodiment of the invention, the client device (106) may represent any physical appliance or computing system designed and configured to receive, generate, process, store, and/or transmit data, as well as to provide an environment in which one or more computer programs may execute thereon. At least one of the aforementioned computer program(s) may facilitate the implementation and use of a virtual desktop, which may be supported by the virtual desktop service (104). Further, in providing an execution environment for any computer programs, the client device (106) may include and allocate various resources (e.g., computer processors, memory, storage, virtualization, network bandwidth, etc.), as needed, to the computer programs and the tasks (or processes) instantiated thereby. At least a portion of these resources can be utilized in the decoding and/or rendering of requested multi-media content from the multi-media source(s) (102) should multi-media redirection (described above) become enabled. While enabled, any requested multi-media content may traverse a direct, one-hop network traffic path (110) between the multi-media source(s) (102) and the client device (106). One of ordinary skill, however, will appreciate that the client device (106) may perform other functionalities without departing from the scope of the invention. Examples of the client device (106) may include, but are not limited to, a desktop computer, a laptop computer, a tablet computer, a mobile device, or any other computing system similar to the exemplary computing system shown in FIG. 3.

In one embodiment of the invention, the multi-media redirection orchestrator (108) may represent any physical appliance or computing system designed and configured to implement latency-driven multi-media redirection. Generally, multi-media redirection may refer to the redirecting and decoding/rendering of multi-media content to/on an endpoint (e.g., client device (106)) rather than the more traditional approach of at/on an information technology (IT) environment (e.g., virtual desktop service (104)). Latency-driven multi-media redirection may therefore refer to the automated enablement or disablement of multi-media redirection based on network latency analyses. To that extent, the multi-media redirection orchestrator (108) may include functionality to perform the method outlined and described below with reference to FIG. 2. One of ordinary skill, however, will appreciate that the multi-media redirection orchestrator (108) may perform other functionalities without departing from the scope of the invention. Examples of the multi-media redirection orchestrator (108) may include, but are not limited to, a desktop computer, a laptop computer, a network server, or any other computing system similar to the exemplary computing system shown in FIG. 3.

In one embodiment of the invention, the above-mentioned system (100) components may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1 shows a configuration of components, other system (100) configurations may be used without departing from the scope of the invention. For example, in one embodiment of the invention, the system (100) may include other additional client devices (not shown), which would operatively connect to the virtual desktop service (104) and/or the multi-media redirection orchestrator (108).

Figure 2:
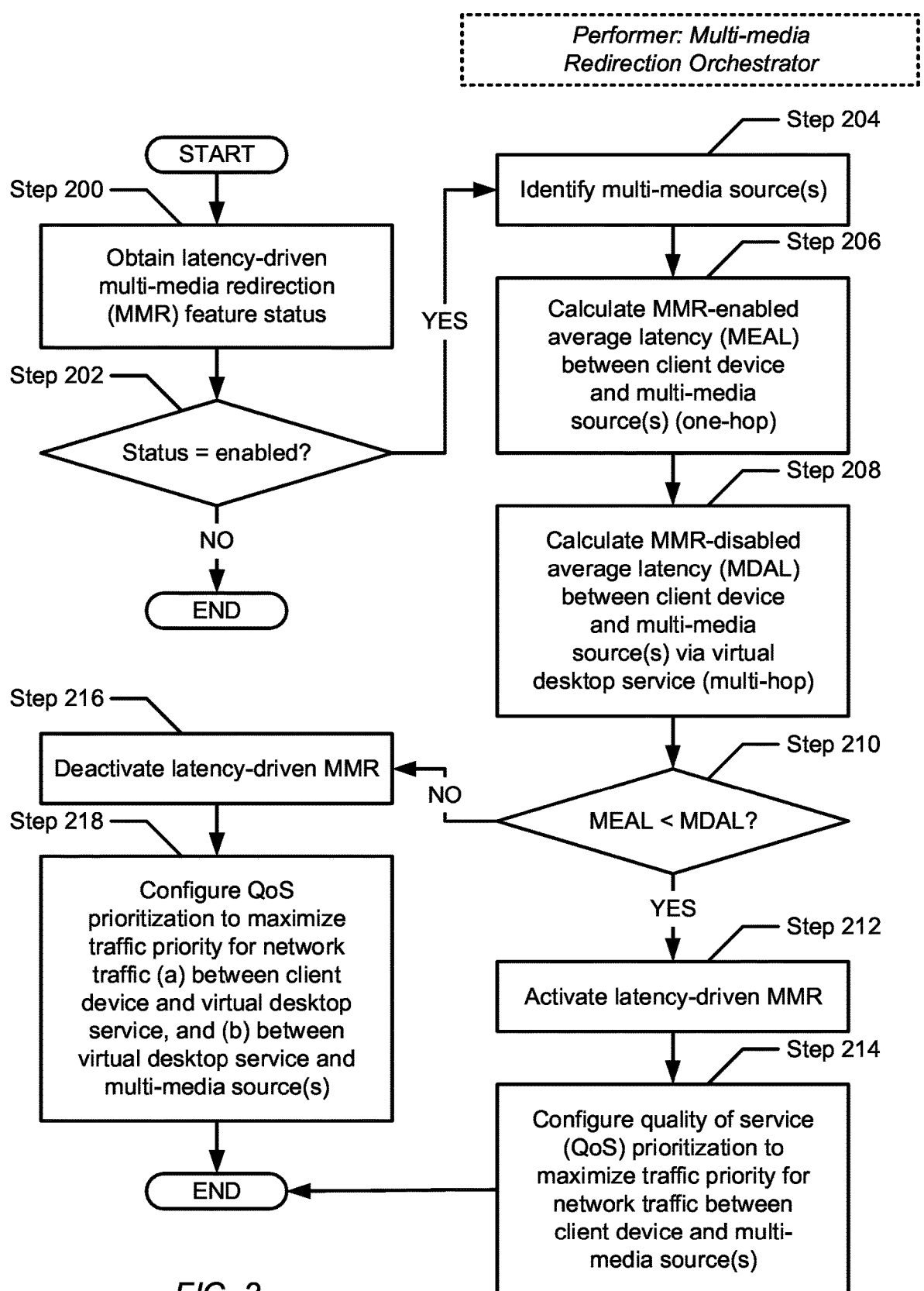
FIG. 2 shows a flowchart describing a method for latency-driven multi-media redirection in accordance with one or more embodiments of the invention.

FIG. 2 shows a flowchart describing a method for latency-driven multi-media redirection in accordance with one or more embodiments of the invention. The various steps outlined below may be performed by the multi-media redirection orchestrator (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 2, in Step 200, a status pertaining to a latency-driven multi-media redirection feature is obtained. In one embodiment of the invention, multi-media redirection may refer to the redirecting and decoding/rendering of multi-media content to/on an endpoint rather than the more traditional approach of at/on an information technology (IT) environment. Latency-driven multi-media redirection may therefore refer to the automated enablement or disablement of multi-media redirection based on network latency analyses. The latency-driven multi-media redirection feature, accordingly, may refer to a network capability that may be toggled by any network administrator.

In Step 202, a determination is made as to whether the status (obtained in Step 200) is indicative that the above-mentioned latency-driven multi-media redirection feature is enabled. In one embodiment of the invention, if it is determined that the status reflects an enabled value, then the method proceeds to Step 204. On the other hand, in another embodiment of the invention, if it is alternatively determined that the status reflects a disabled value, then the method alternatively ends.

In Step 204, following the determination (in Step 202) that the status of the latency-driven multi-media redirection feature (obtained in Step 200) reflects an enabled value, one or more multi-media sources is/are identified. In one embodiment of the invention, a multi-media source may represent any physical appliance, computing system, or software application (executing on the underlying hardware of a physical appliance or computing system) designed and configured to store and share multi-media locally or remotely over a network. Further, the multi-media source(s) may be identified through a combination of cached information from previous client device user activity, as well as administrator entered information reflective of future activity expectations.

In Step 206, a multi-media redirection enabled average latency is calculated. In one embodiment of the invention, network latency may generally refer to the length of time (e.g., measured in milliseconds) that network traffic takes to traverse a network, either one-way or round-trip, between a given pair of network entities. Further, recall from above that when multi-media redirection is employed (or enabled), multi-media content may be redirected to an endpoint (rather than be directed to an IT environment) to be decoded and/or rendered. A multi-media redirection enabled latency, accordingly, may refer to a measured network latency between network traffic exchanged directly (i.e., via a one-hop network path) between a single multi-media source and an endpoint (or client device).

In one embodiment of the invention, when the multi-media source(s) (identified in Step 204) include only one multi-media source, then the multi-media redirection enabled average latency may be calculated as the multi-media redirection enabled latency measured for a direct, one-hop network traversal between that one multi-media source and the endpoint. In another embodiment of the invention, when the multi-media source(s) (identified in Step 204) alternatively include two or more multi-media sources, then the multi-media redirection enabled average latency may be calculated as the arithmetic mean of a set of multi-media redirection enabled latencies, where each multi-media redirection enabled latency in the aforementioned set may reflect a latency measurement for a direct, one-hop network traversal between a different multi-media source and the endpoint. Furthermore, any form of network latency may be measured using any existing latency measuring mechanisms, such as pinging.

In Step 208, a multi-media redirection disabled average latency is calculated. Again, from above, in one embodiment of the invention, when multi-media redirection is not employed (or disabled), multi-media content may be directed (as representative of the traditional approach) to the IT environment (e.g., virtual desktop service) to be decoded and/or rendered. The multi-media content may subsequently be delivered and/or interacted with via virtual desktop related network traffic exchanged between the IT environment and the endpoint. A multi-media redirection disabled latency, accordingly, may refer to a measured network latency between network traffic exchanged indirectly (i.e., via a multi-hop network path) between a single multi-media source and an endpoint (or client device) by way of the IT environment.

In one embodiment of the invention, when the multi-media source(s) (identified in Step 204) include only one multi-media source, then the multi-media redirection disabled average latency may be calculated as the multi-media redirection disabled latency measured for an indirect, multi-hop network traversal between that one multi-media source and the endpoint via the IT environment. In another embodiment of the invention, when the multi-media source(s) (identified in Step 204) alternatively include two or more multi-media sources, then the multi-media redirection disabled average latency may be calculated as the arithmetic mean of a set of multi-media redirection disabled latencies, where each multi-media redirection disabled latency in the aforementioned set may reflect a latency measurement for an indirect, multi-hop network traversal between a different multi-media source and the endpoint via the IT environment.

In Step 210, a determination is made as to whether the multi-media redirection enabled average latency (calculated in Step 206) is less than the multi-media redirection disabled average latency (calculated in Step 208). In one embodiment of the invention, if it is determined that the former is indeed less than the latter, then the method proceeds to Step 212. On the other hand, in another embodiment of the invention, if it is alternatively determined that the former matches or exceeds the latter, then the method alternatively proceeds to Step 216.

In Step 212, following the determination (in Step 210) that the multi-media redirection enabled average latency (calculated in Step 206) is less than the multi-media redirection disabled average latency (calculated in Step 208), latency-driven multi-media redirection is activated/enabled. In one embodiment of the invention, enablement of latency-driven multi-media redirection may implement the redirection of multi-media content from the multi-media source(s) to the endpoint (rather than the IT environment in the more traditional approach) for decoding and/or rendering. Further, activation of latency-driven multi-media redirection may, for example, entail the implementation of an active directory group policy. In networking, an active directory may refer to a collection of network resources (e.g., users, client devices, multi-media source(s), etc.) within a particular domain. To that extent, an active directory group policy may refer to the configuration of the collection of network resources, as a group, to apply one or more given policies through a centralized framework. One of these applied policies may enact latency-driven multi-media redirection.

In Step 214, a quality of service (QoS) prioritization is configured. In one embodiment of the invention, through QoS prioritization, network administrators may prioritize the use of available network bandwidth to support certain network devices (e.g., switches, routers, etc.) or certain network traffic based on an assigned criticality of the devices or network traffic. The QoS prioritization described here may entail the re-configuring of QoS-capable network devices, positioned along the direct network path between the multi-media source(s) and the endpoint, to prioritize network bandwidth in support of the multi-media related network traffic traversing there-through. Further, through implementation of the aforementioned QoS prioritization, network latency, measured along the direct network path, may be further reduced to maximize endpoint (or client device) user experience.

In Step 216, following the alternative determination (in Step 210) that the multi-media redirection enabled average latency (calculated in Step 206) matches or exceeds the multi-media redirection disabled average latency (calculated in Step 208), latency-driven multi-media redirection is deactivated/disabled. In one embodiment of the invention, disablement of latency-driven multi-media redirection may retain the more traditional approach of directing multi-media content from the multi-media source(s) the IT environment for decoding and/or rendering. Further, deactivation of latency-driven multi-media redirection may, for example, entail refraining from performing any of the implementation mechanisms (described above) in relation to latency-driven multi-media redirection activation.

In Step 218, a QoS prioritization (described above) is configured. In one embodiment of the invention, the QoS prioritization described here may entail the re-configuring of QoS-capable network devices, positioned along the indirect network path between the multi-media source(s) and the endpoint by way of the IT environment, to prioritize network bandwidth in support of the multi-media related network traffic traversing there-through. Further, through implementation of the aforementioned QoS prioritization, network latency, measured along the indirect network path, may be further reduced to maximize endpoint (or client device) user experience.

Figure 3:
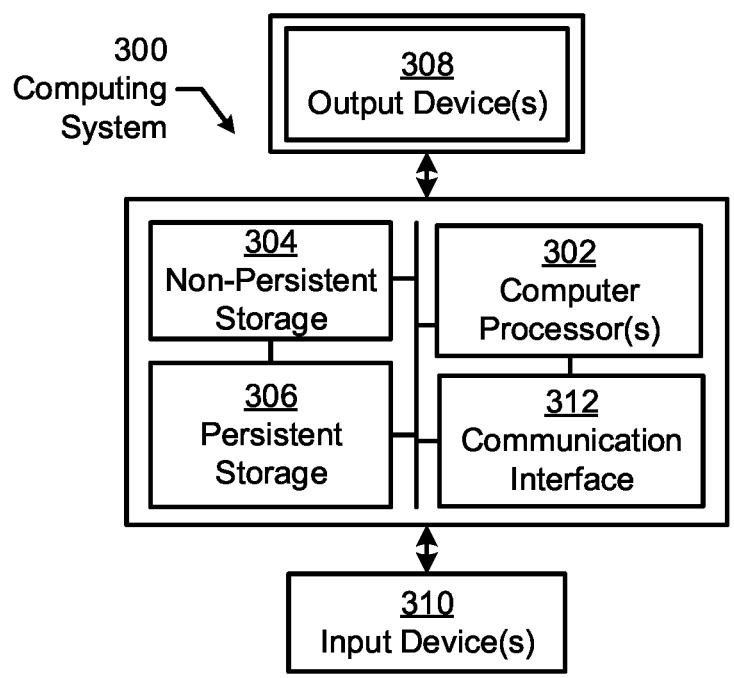
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for latency-driven multi-media redirection, the method comprising:
 identifying at least one multi-media source;
 calculating a first average latency for first multi-media network traffic traversing through a direct network path from the at least one multi-media source to a client device;

calculating a second average latency for second multi-media network traffic traversing through an indirect network path from the at least one multi-media source to the client device; and managing multi-media network traffic from the at least one multi-media source to the client device based on a relation between the first average latency and the second average latency, the managing of the multi-media network traffic comprising:
- making a determination that the first average latency is less than the second average latency; and
- enabling, based on the determination, the latency-driven multi-media redirection,
  - wherein enabling the latency-driven multi-media redirection re-routes traversal of the multi-media network traffic through the direct network path,
  - wherein the enabling of the latency-driven multi-media redirection is implemented using an active directory group policy applied to a collection of network resources comprising the at least one multi-media source and the client device.

2. The method of claim 1, wherein the indirect network path passes through a virtual desktop service disposed between the at least one multi-media source and the client device.

3. The method of claim 1, wherein managing the multi-media network traffic from the at least one multi-media source to the client device further comprises configuring a quality of service (QoS) prioritization to minimize latency experienced by the multi-media network traffic while traversing the direct network path.

4. A non-transitory computer readable medium (CRM) comprising computer readable program code, which when executed by a computer processor, enables the computer processor to perform a method for latency-driven multi-media redirection, the method comprising:
- identifying at least one multi-media source;
- calculating a first average latency for first multi-media network traffic traversing through a direct network path from the at least one multi-media source to a client device;
- calculating a second average latency for second multi-media network traffic traversing through an indirect network path from the at least one multi-media source to the client device; and
- managing multi-media network traffic from the at least one multi-media source to the client device based on a relation between the first average latency and the second average latency, the managing of the multi-media network traffic comprising:
  - making a determination that the first average latency is less than the second average latency; and
  - enabling, based on the determination, the latency-driven multi-media redirection,
    - wherein enabling the latency-driven multi-media redirection re-routes traversal of the multi-media network traffic through the direct network path,
    - wherein the enabling of the latency-driven multi-media redirection is implemented using an active directory group policy applied to a collection of network resources comprising the at least one multi-media source and the client device.

5. The non-transitory CRM of claim 4, wherein the indirect network path passes through a virtual desktop service interposed between the at least one multi-media source and the client device.

6. The non-transitory CRM of claim 4, wherein managing the multi-media network traffic from the at least one multi-media source to the client device further comprises configuring a quality of service (QoS) prioritization to minimize latency experienced by the multi-media network traffic while traversing the direct network path.

7. A system, the system comprising:
- at least one multi-media source;
- a client device operatively connected to the at least one multi-media source; and
- a multi-media redirection orchestrator operatively connected to the at least one multi-media source and the client device, and comprising a computer processor configured to perform a method for latency-driven multi-media redirection, the method comprising:
  - identifying the at least one multi-media source;
  - calculating a first average latency for first multi-media network traffic traversing through a direct network path from the at least one multi-media source to a client device;
  - calculating a second average latency for second multi-media network traffic traversing through an indirect network path from the at least one multi-media source to the client device; and
  - managing multi-media network traffic from the at least one multi-media source to the client device based on a relation between the first average latency and the second average latency, the managing of the multi-media network traffic comprising:
    - making a determination that the first average latency is less than the second average latency; and
    - enabling, based on the determination, the latency-driven multi-media redirection,
      - wherein enabling the latency-driven multi-media redirection re-routes traversal of the multi-media network traffic through the direct network path,
      - wherein the enabling of the latency-driven multi-media redirection is implemented using an active directory group policy applied to a collection of network resources comprising the at least one multi-media source and the client device.

8. The system of claim 7, the system further comprising:
a virtual desktop service operatively connected to the at least one multi-media source, the client device, and the multi-media redirection orchestrator.

9. The system of claim 8, wherein the virtual desktop service is interposed between the at least one multi-media source and the client device.

10. The system of claim 7, wherein the multi-media redirection orchestrator comprises a physical appliance.

11. The method of claim 2, wherein by enabling the latency-driven multi-media redirection, multi-media content from the at least one multi-media source is decoded on the client device instead of the virtual desktop service.

12. The method of claim 11, wherein content requests for the multi-media content is submitted to the at least one multi-media source by the virtual desktop service.

13. The method of claim 1, wherein the at least one multi-media source is identified based on cached information reflective of previous user activity of a user of the client device.

14. The method of claim 13, wherein the at least one multi-media source is identified further based on administrator entered information reflective of future activity expectations by the user of the client device.

15. The non-transitory CRM of claim 5, wherein by enabling the latency-driven multi-media redirection, multi-media content from the at least one multi-media source is decoded on the client device instead of the virtual desktop service.

16. The non-transitory CRM of claim 15, wherein content requests for the multi-media content is submitted to the at least one multi-media source by the virtual desktop service.

17. The non-transitory CRM of claim 4, wherein the at least one multi-media source is identified based on cached information reflective of previous user activity of a user of the client device.

18. The non-transitory CRM of claim 17, wherein the at least one multi-media source is identified further based on administrator entered information reflective of future activity expectations by the user of the client device.

* * * * *